R. W. BUCKLES.
Rotary-Harrow.
No. 24,095
Patented May 24, 1859.
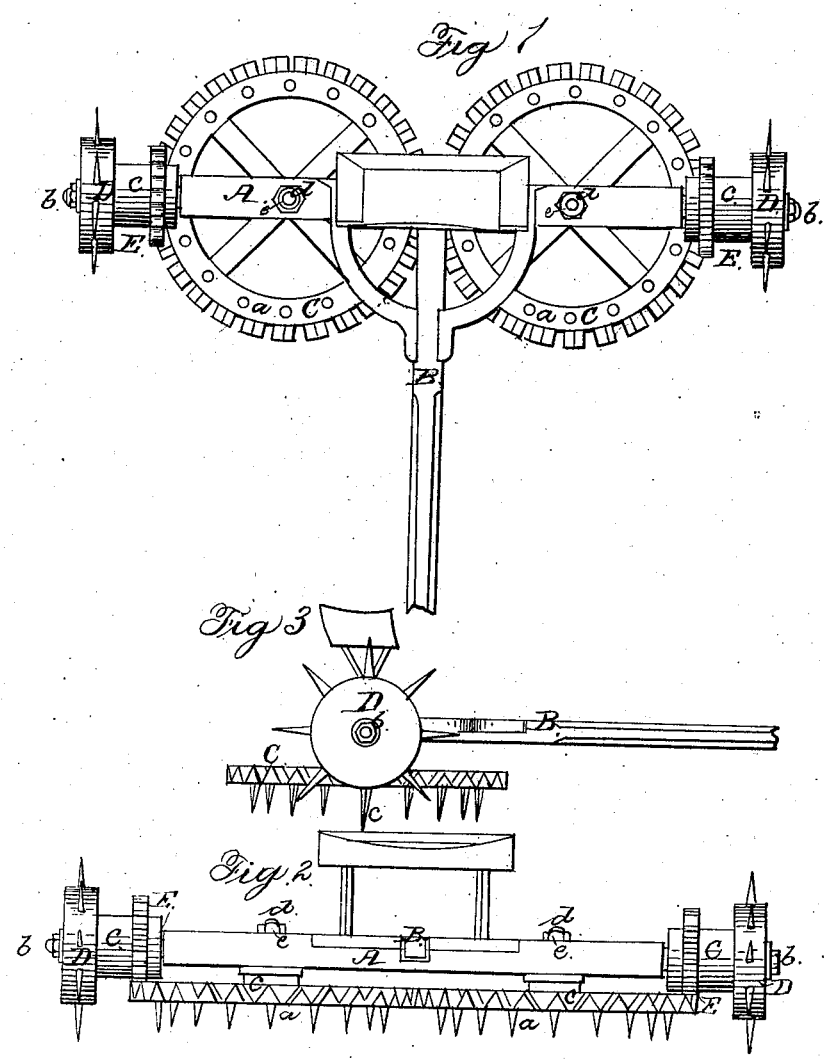

UNITED STATES PATENT OFFICE.

ROBERT W. BUCKLES, OF GRAYVILLE, ILLINOIS.

IMPROVEMENT IN HARROWS.

Specification forming part of Letters Patent No. 24,095, dated May 24, 1859.

*To all whom it may concern:*

Be it known that I, ROBERT W. BUCKLES, of Grayville, in the county of White and State of Illinois, have invented certain Improvements in Harrows, the construction and operation of which I have described in the following specification and illustrated in the accompanying drawings with sufficient clearness to enable competent and skillful workmen in the arts to which it pertains or is most nearly allied to make and use my invention.

My said invention consists in the combination of two horizontal toothed wheels with cogs arranged on their peripheries, and attached beneath an axle with two vertical toothed wheels working independent of each other on the ends of the axle and having pinions attached and working into the cogs on the horizontal wheels, by which motion is imparted to them, each horizontal wheel working independent of the other, for the purposes hereinafter set forth.

In the accompanying drawings my invention is represented as follows: Figure 1 is a plan of my improved harrow. Fig. 2 is a front elevation. Fig. 3 is a side elevation.

A represents an axle having a tongue, B, attached in the center for the draft equidistant from the center, and pivoted beneath the frame are two horizontal toothed wheels, C C, on the outer edge of which are cogs forming a part of the wheels.

D D are vertical toothed wheels running on journals $b$ $b$ of the axle A.

$c$ $c$ are the hubs of the vertical wheels D D, upon which are secured pinions E E, which mesh into the cogs of the horizontal wheels, thereby giving them a rotating motion while the machine is being drawn along the ground.

$a$ $a$ are the harrow-teeth, secured in the under side of the horizontal wheels, which are attached to the frame by means of bolts $d$ $d$ passing up through the center of said wheels, on through the frame, and secured by a nut, $e$.

My invention is so fully and plainly shown in the drawings as to render a more detailed description unnecessary.

The operation of my improved harrow is as follows: While the machine is passing over the ground to be cultivated the greater part of the weight of the machine resting upon the two vertical toothed wheels causes their teeth to take hold upon the soil, thereby giving a rotating motion to each of the wheels independent of the other, by which arrangement either of the horizontal wheels can be turned without moving the other, which allows the harrow to be turned with ease and facility. The vertical wheels are placed on the outside of the horizontal wheels and opposite to each other on the axle, thereby preventing any side draft.

I am aware that various means have been devised and applied to give a rotary motion to wheels for harrowing purposes. I am also aware that rotary motion has been given to two horizontal wheels by a vertical toothed wheel running between two horizontal wheels and imparting motion by means of pinions secured upon one shaft. I therefore disclaim all such arrangements as forming no part of my invention; but What I do claim as constituting my said invention, and which I claim to be the original and first inventor of, is—

Two harrows hung to one frame independent of each other, with two vertical toothed wheels, D D, also working independently of each other, and connected to the horizontal wheels C C, which are actuated by means of pinions E E, as described, for the purposes set forth.

R. W. BUCKLES.

Witnesses:
JOHN D. MARTIN,
J. EDWARD CLARKE.